Patented Oct. 10, 1922.

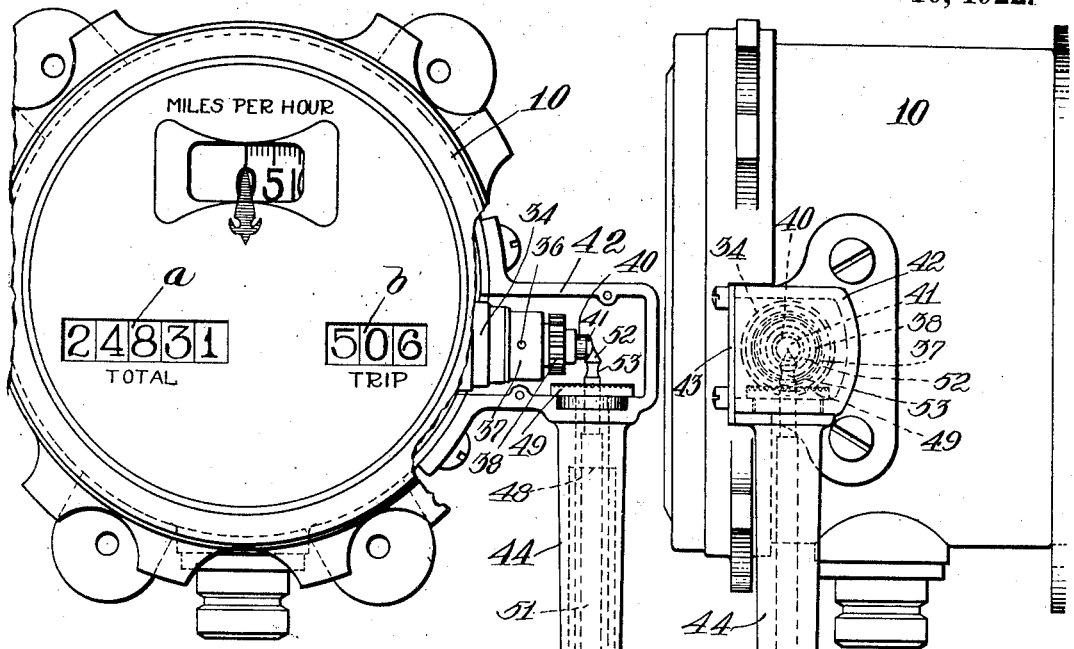

1,431,343

UNITED STATES PATENT OFFICE.

GEORGE W. TONEY, OF WALTHAM, MASSACHUSETTS, ASSIGNOR TO WALTHAM WATCH COMPANY, OF WALTHAM, MASSACHUSETTS, A CORPORATION OF MASSACHUSETTS.

COUNTER-RESETTING MECHANISM.

Application filed August 16, 1920. Serial No. 403,930.

*To all whom it may concern:*

Be it known that I, GEORGE W. TONEY, a citizen of the United States, residing at Waltham, in the county of Middlesex and State of Massachusetts, have invented new and useful Improvements in Counter-Resetting Mechanism, of which the following is a specification.

The present invention relates to odometers and instruments of similar nature, having number indicators adapted to show distances, operations, etc.; and is particularly concerned with means for re-setting such number indicators to zero position or to any other selected position when occasion requires.

Re-setting means are widely and commonly used with odometers designed for recording the mileage traveled by motor cars, and it is in connection with the instrument intended for the particular purpose just indicated that I have devised the specific form of my invention illustrated in the drawings furnished with this specification. Therefore, in the following description I will generally direct attention by explanation to the characteristics and uses of such an instrument in connection with a motor vehicle; doing so, however, for the purpose of clear and concise illustration and without intending thereby to indicate any limitation of the invention to a particular construction or type of counting apparatus.

The general objects of the invention are first to provide number disks (or equivalent number indicators) to be turned in unison for re-setting; second, to enable the resetting to be carried out by an initial rotation of the right hand disk or indicator alone; and third, to provide a manually actuated mechanism convenient for enabling either mode of re-setting to be practised by the employment on the part of the operator of the digits of one hand alone.

In the drawings Figure 1 is a face view of an odometer instrument designed particularly for motor cars having my invention applied thereto.

Figure 2 is a side view of the instrument.

Figure 3 is a sectional view of what may be called the operating part of the re-setting means.

Figure 4 is an axial sectional view of the number indicators which are re-set by my improved means, and shows also the driving and part of the re-setting means therefor.

Figure 5 is a cross section taken on line 5—5 of Figure 4 and viewed in the direction of the arrows.

Figure 6 is a perspective view of the combined coupling and driving element of the mechanism.

The same reference characters indicate the same parts wherever they are found in all the figures.

In common with many other odometer instruments the one here shown is provided with a totalizing counter $a$, which is not re-set, and with a trip counter or indicator $b$, which may be re-set as occasion requires. The latter indicator is used to show the distance traveled by the vehicle in a given length of time or the distance between certain points in the course of travel. The number indicating units, driving mechanism therefor and other features of the instrument are enclosed in a case 10 as usual.

Referring to Figure 4, which shows the trip indicator in detail, the same consists of three disks 11, 12 and 13 bearing equally spaced numbers on their peripheral faces running from zero to 9. The disk 11 may for the purposes of this description be called the unit disk, although in practise it is usually so driven as to indicate tenths of miles, the disk 12, which ordinarily indicates miles, is the tens indicating disk of the series, and the disk 13 is the hundreds indicating disk. A shaft 14, which derives motion from the motion of the vehicle, passes centrally through the disks and is fitted within the bore of a sleeve 15, which is part of a combined coupling and driving member. This combined member has at one end an enlarged head 16 within the units disk, on the periphery of which are a continuous series of gear teeth 17 and in a zone beside such gear teeth a pair of teeth 18 or short gear segment, as shown in Figure 6. The outer end of the combined member has a series of ratchet teeth 19 forming a clutch element and adapted to mesh with complemental teeth on a clutch element 20, which is made fast to the shaft as by a pin 21. The combined member is movable endwise on the shaft to disengage and engage the clutch elements, and it is normally held by a spring 22 with the complemental clutch teeth coupled together.

The units disk has an extended hub sleeve 23 which fits on the outside of the combined member 15 freely enough to permit endwise movement of the latter, but a rotation transmitting engagement is made between the combined member and the disk by a flattened or cut away side 24 of the combined member and a complemental web 25 on the interior of the disk hub.

For carrying motion from the units disk to the tens disk there is provided an intermediate pinion having a toothed zone 26 in the same zone with the gear segment 18, and a second toothed zone 27 partly in the same plane with a series of teeth 28 on the right hand end of the hub of the disk 12 and partly projecting to the right of that plane. A holder 29 of any suitable construction supports the intermediate pinion from a fixed sleeve 30 in which the shaft has its bearing. Nothing novel with the present invention is involved in the supporting means for the intermediate pinion and no detailed description thereof is deemed necessary. A groove or space 31 is provided between the above described zones 26 and 27 of the carrying pinion, and a spring pawl 32 is provided to engage the teeth of the zone 27 and restrain the pinion from unintended rotation. The form of pawl here used is shown in Figure 5 and it is made of a spring strip bent on a curve at its middle to embrace the sleeve 30 between retaining flanges thereon, while its ends or legs extend to opposite sides of the pinion and are offset toward the latter sufficiently to form angles 33 capable of acting in the manner of pawls in the spaces between adjacent teeth of the pinion. The right hand end of the zone 27 of the pinion projects to the right from the side of the spring pawl, thereby permitting the gear teeth 17 of the coupling and driving element to be brought into mesh with the teeth of said zone when said element is shifted to the left from the normal position. That position shown in Figure 4 is the normal position, and therein the gear teeth 17 are in the zone of the groove 31, and rotated therein without engaging the intermediate pinion.

In Figure 4, 34 represents a sleeve forming an external bearing for the sleeve of the units disk, and 35 is part of a support by which said bearing sleeve is held stationary in the instrument.

On the end of the units disk hub is fixed, by a pin 36 or any other suitable way, a sleeve 37 which carries a pinion 38. Within the disk hub and surrounding the clutch element 20 is a shell 39 abutting against the end of the coupling and driving member.

A stem 40 associated with the shell 39 passes through the pinion 38 co-axial therewith and protrudes from the hub of the pinion, having a spherical or otherwise suitably tapered end surface 41.

The gear and stem just described project from the side of the casing 10, as shown in Figure 1, and are enclosed by an accessory casing or box 42 secured to the side of the casing and having a detachable cover 43. A sleeve 44 extends from the box 42 and provides a bearing for one end of a tubular shaft 45 and likewise an enclosure for a spring 46 surrounding said tubular shaft, pressing against a collar 47 secured to the latter, and reacting against an internal abutment shoulder 48 in the sleeve. A crown gear 49 is secured to the tubular shaft within the box 42 and is adapted to mesh with the pinion 38, although it is normally held out of mesh therewith by the spring 46.

A knob or crown 50 on the outer end of the tubular shaft enables the latter to be moved endwise and rotated. Equivalent to the spur pinion 38 and crown gear 49 in this combination are beveled gears or any other form of gear couple adapted to transmit rotation between shafts running at an angle to one another, and one of which is capable of being moved into and out of mesh with the other by endwise displacement of its shaft.

Fitted within the tubular shaft 45 and able to move endwise therein is a rod 51, which protrudes at one end from the crown 50, and at its other end is formed with a tapered surface 52 complemental to the tapered surface 41 and adapted to displace the stem 40 when moved endwise. Adjacent to the tapered surface is a groove 53 encircling the rod and adapted to engage with the end of the stem to hold the rod in its displaced position, wherein it causes displacement of the stem.

It will be apparent from the foregoing explanation in connection with the drawings that when the coupling and driving member is in the position shown, rotation of the number disk 11 will cause an intermittent rotation of the next disk 12 through one tenth of a turn whenever it completes a rotation. Such movement of the first disk may be given either by the shaft 14 acting through the clutch element 20 and driving member 15, or by the tubular shaft 45 acting through the gear 49 and pinion 38; in the latter case the ratchet clutch is not uncoupled at the same time driving of the disk is possible in the forward direction only. It is to be understood, of course, that suitable carrying mechanism is provided between the disks 12 and 13, which carrying mechanism may be of any sort heretofore known, and preferably is of a type to lock the disk 13 and prevent any rotation thereof except the intermittent movement carried from the disk 12. There is nothing except the yielding pawl 32 to prevent rotation of the disk 12.

The motion previously described as being given to the number disks through the shaft 14 is that which is communicated when the vehicle is in motion and causes registration of the distance traveled. That given through the pinion 38 without uncoupling the ratchet clutch accomplishes what may be called the slow re-setting and may be manually carried out at any time. In the slow re-setting the second disk is turned only one-tenth as fast as the first disk. A quick re-setting is effected by moving both the rod 51 and the tubular shaft endwise and then rotating the shaft. Then the stem 40 is moved inward and displaces the driving member 15, disconnecting the clutch 19, 20, and meshing the continuous gear teeth 17 with the left hand zone of the intermediate pinion. Then rotation of the setting crown causes the second disk to be turned in unison with the right hand disk, because the latter disk and the coupling and driving member are compelled to rotate in unison, and the pinion zone 27 is an idler pinion transmitting motion from a gear 17 to a gear 28 of the same size. Thereby the trip odometer can be set to zero in one-tenth of the time and with one-tenth of the effort needed to accomplish the same end through the slow re-setting accomplished when the coupling member is in position to engage the complemental clutch element. The slow re-setting operation enables the right hand disk to be brought into a prescribed relation to the adjacent left hand disk without shifting the latter, and may be used to bring the same numbers on the two disks beside one another preliminary to re-setting to the zero position, or to bring any desired series of digits into view at the side opening of the odometer face.

The endwise movement of both the tubular shaft and contained rod may be carried out by the operator using the thumb and finger of one hand only, and after this has been accomplished the rod is automatically held in the inward position, where it requires no more attention from the operator, but the latter's attention may be concentrated on correctly re-setting the number disks. Also the shaft may be moved without displacing the contained rod when the slow re-setting action is to be carried out.

A feature which I consider to be important is that the mechanism is put into condition for what I have called the quick re-setting action without displacement laterally of the right hand disk. This disk remains always in the same location whether driven in the normal course of indicating movement or for re-setting at a slow rate or when the mechanism is put in condition to be re-set at the rapid rate.

Nothing is to be implied from the structural details herein shown and described of a particular instrument by way of limitation of the protection herein sought. The principles embodied in the means described, and pointed out in the claims may likewise be embodied in many diverse forms and applied to many specifically different types of instruments.

What I claim and desire to secure by Letters Patent is:—

1. A counting mechanism comprising a series of number indicators, a carrying pinion between two of said indicators and having separated zones, and a driving member coupled with the right hand one of said last named indicators and being provided with a continuous series of gear teeth and with a discontinuous gear segment, said element being movable to bring either its discontinuous segment into mesh with one of said pinion zones or its continuous series of teeth in mesh with the other of said zones.

2. An odometer comprising a series of number disks, a driving member having a rotation-transmitting connection with the right hand disk of the series and being movable endwise relatively thereto, separate carrying gear elements in mesh with the adjacent left hand disk, and a discontinuous gear segment and a continuous series of gear teeth on said driving member adapted to be put alternately into mesh with one or the other of the aforesaid gear elements.

3. In an odometer, a series of number indicators and means for re-setting said indicators adapted either to drive two of them substantially in unison, or one of them at a rate slower than the other, without necessitating displacement as to the position of either indicator.

4. The combination with a series of number indicators and mechanism for carrying intermittent rotation from an indicator of lower denomination to the next indicator of higher denomination, of a coupling and driving member associated with one of said indicators in a manner to impart normal indicating movement thereto and adapted to deliver either intermittent or continuous rotation to the indicator of next higher denomination.

5. The combination with a series of number indicators and mechanism for carrying intermittent rotation from an indicator of lower denomination to the next indicator of higher denomination, of a coupling and driving member associated with one of said indicators and adapted to deliver either intermittent or continuous rotation to the indicator of next higher denomination, said member being rotatable in unison with the first specified indicator and having provision for axial movement relatively thereto for effecting alternately the driving conditions set forth.

6. An odometer re-setting mechanism comprising the combination with a number indicator and driving means therefor, including a disconnectible clutch, of a separate resetting driver for said indicator and a clutch disconnector, said driver and disconnector being each arranged for operation independently of the other.

7. An odometer re-setting mechanism comprising the combination with a number indicator and driving means therefor, including a disconnectible clutch, of a separate resetting driver for said indicator and a clutch disconnector, said resetting driver being operable in association with said clutch disconnector or independently thereof.

8. An odometer comprising a series of number indicators, a driving mechanism including a disconnectible clutch for the indicator of lowest denomination, a driving member in rotation-transmitting connection with said last named indicator adapted to be shifted into connection with the indicator of next higher denomination for rotating the same at substantially the same rate as the previously specified indicator, a manually operable driver adapted to be put in driving connection with the indicator of lowest denomination, and a shifter operable to place said coupling member in condition for causing the aforesaid unison of rotation with the higher denomination indicator.

9. An odometer comprising a series of number indicators, a driving mechanism including a disconnectible clutch for the indicator of lowest denomination, a driving member in rotation-transmitting connection with said last named indicator adapted to be shifted into connection with the indicator of next higher denomination for rotating the same at substantially the same rate as the previously specified indicator, a manually operable driver adapted to be put in driving connection with the indicator of lowest denomination, and a shifter operable to place said coupling element in condition for causing the aforesaid unison of rotation with the higher denomination indicator, said driver and shifter being arranged for operation by the digits of one hand.

10. The combination with an odometer and a series of number indicators, of driving means including a disconnectible clutch for one of said indicators, a manually operable clutch disconnector consisting of a displaceable stem having a tapered end and a rod at an angle to said stem having a tapered end complemental to that of the stem arranged to displace the stem so as to uncouple the clutch when moved in one direction, a rotatable tubular shaft surrounding said rod, and complemental driving members connected to said tubular shaft and the aforesaid indicator respectively.

11. The combination with an odometer and a series of number indicators, of driving means including a disconnectible clutch for one of said indicators, a manually operable clutch disconnector consisting of a displaceable stem having a tapered end and a rod at an angle to said stem having a tapered end complemental to that of the stem arranged to displace the stem so as to uncouple the clutch when moved in one direction, a rotatable tubular shaft surrounding said rod, and complemental driving members connected to said tubular shaft and the aforesaid indicator respectively, said driving members being adapted to be brought into operative mesh by endwise movements of said tubular shaft.

12. An odometer having number disks in axially aligned series, a driving shaft having a clutch element, a complemental clutch element associated with the right hand disk and displaceable for coupling and uncoupling the latter from the shaft, a gear element connected externally to the said right hand disk, a stem protruding from said gear element and movable endwise to effect disconnection of said clutch elements, said stem having a tapered end face, a rod making an angle with the stem, having a tapered surface complemental to the end face of the stem and being movable endwise to effect clutch disconnecting movement of the stem by the wedging effect of its tapered end, said rod having also a groove adapted to be entered by the stem end for retaining the stem in its displaced position, a shaft surrounding rod being movable endwise and a gear carried by said shaft adapted to be brought by endwise movement of the latter into operative mesh with the aforesaid gear.

In testimony whereof I have affixed my signature.

GEORGE W. TONEY.